United States Patent
Qi et al.

(10) Patent No.: US 10,880,831 B2
(45) Date of Patent: Dec. 29, 2020

(54) SYSTEMS, METHODS, AND APPARATUS FOR A SHORT BEACON IN LOW RATE WI-FI COMMUNICATIONS

(71) Applicant: Intel Corporation, Santa Clara, CA (US)

(72) Inventors: Emily H. Qi, Camas, WA (US);
Thomas J. Kenney, Portland, OR (US);
Eldad Perahia, Portland, OR (US);
Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/142,998

(22) Filed: Apr. 29, 2016

(65) Prior Publication Data

US 2016/0248564 A1 Aug. 25, 2016

Related U.S. Application Data

(63) Continuation of application No. 13/977,580, filed as application No. PCT/US2011/065572 on Dec. 16, 2011, now abandoned.
(Continued)

(51) Int. Cl.
  *H04W 52/02* (2009.01)
  *H04W 56/00* (2009.01)
  (Continued)

(52) U.S. Cl.
  CPC ....... *H04W 52/0216* (2013.01); *H04L 5/0048* (2013.01); *H04L 69/324* (2013.01);
  (Continued)

(58) Field of Classification Search
  CPC combination set(s) only.
  See application file for complete search history.

(56) References Cited

U.S. PATENT DOCUMENTS

| | | | |
|---|---|---|---|
| 2002/0131484 A1 | 9/2002 | Diepstraten et al. | |
| 2008/0175166 A1* | 7/2008 | Oerton | H04W 48/16 370/254 |

(Continued)

FOREIGN PATENT DOCUMENTS

| | | |
|---|---|---|
| CN | 101442551 | 5/2009 |
| CN | 101965023 A2 | 2/2011 |
| EP | 0615363 | 2/1994 |

OTHER PUBLICATIONS

IEEE Std. 802.11v-2011 (Feb. 9, 2011).*
(Continued)

*Primary Examiner* — Yee F Lam
(74) *Attorney, Agent, or Firm* — Eversheds Sutherland (US) LLP

(57) ABSTRACT

Certain embodiments of the invention may include systems, methods, and apparatus for a short beacon in low rate Wi-Fi communications. According to an example embodiment of the invention, a method is provided for generating a short beacon. The method can include generating a short beacon frame for transmission at a selectable beacon interval. The short beacon frame includes: a beacon timestamp field, a service set identifier (SSID) field, and one or more capability fields; and generating a traffic indicator map (TIM) frame for transmission at a selectable TIM interval. The TIM frame includes a TIM timestamp field, a check beacon field, and a TIM; and converting the short beacon frame and the TIM frame for wireless transmission over a hardware transmission medium.

13 Claims, 3 Drawing Sheets

Related U.S. Application Data

(60) Provisional application No. 61/522,561, filed on Aug. 11, 2011.

(51) Int. Cl.
*H04W 84/12* (2009.01)
*H04W 28/02* (2009.01)
*H04L 5/00* (2006.01)
*H04L 29/08* (2006.01)

(52) U.S. Cl.
CPC ... *H04W 28/0221* (2013.01); *H04W 28/0236* (2013.01); *H04W 56/00* (2013.01); *H04W 84/12* (2013.01); *Y02D 30/70* (2020.08)

(56) References Cited

U.S. PATENT DOCUMENTS

| | | |
|---|---|---|
| 2008/0219196 A1 | 9/2008 | Ptasinski |
| 2008/0225768 A1* | 9/2008 | Wentink ............ H04W 52/0216 370/311 |
| 2009/0052408 A1 | 2/2009 | Kwak et al. |
| 2009/0088183 A1 | 4/2009 | Piersol et al. |
| 2010/0315983 A1* | 12/2010 | Choi ................. H04W 52/0251 370/311 |
| 2012/0155343 A1* | 6/2012 | Wentink ................ H04W 88/08 370/310 |
| 2013/0176922 A1* | 7/2013 | Abraham ............. H04W 28/06 370/311 |

OTHER PUBLICATIONS

Information Disclosure Statement filed in U.S. Appl. No. 13/977,580 on Jun. 3, 2015, 4 pages.
Information Disclosure Statement filed in U.S. Appl. No. 13/977,580 on Jan. 23, 2015, 4 pages.
Information Disclosure Statement filed in U.S. Appl. No. 13/977,580 on Jun. 25, 2014, 4 pages.
Information Disclosure Statement filed in U.S. Appl. No. 13/977,580 on Oct. 9, 2013, 4 pages.
Office Action Issued in Chinese Patent Application No. 201180073160.3 dated Feb. 3, 2016, 9 pages; English Translation 6 pages.
European Search Report for European Patent Application No. 11870595.3, dated Sep. 22, 2016, 8 pages.
Office Action for Chinese Patent Application No. 201180073160.3, dated Oct. 10, 2016, 6 pages (3 pages English Translation).
Examination Report for European Application No. EP 11870595.3, dated Mar. 1, 2017, 5 pages.
Final Rejection for U.S. Appl. No. 13/977,580, dated Nov. 24, 2017, 12 pages.
Office Action issued in European Application No. 16174041.0, dated Apr. 6, 2018 (8 pages).
First office action from Chinese Application No. 201610490512.X, dated Nov. 5, 2018, 22 pages (14 English translation, 8 Chinese).
Office Action for Chinese Application No. 201610490512, dated Dec. 9, 2019, 13 pages (9 pages English, 4 pages Chinese).
Office Action for European Application No. 16174041, dated Oct. 7, 2019, 5 pages.

* cited by examiner

SYSTEMS, METHODS, AND APPARATUS FOR A SHORT BEACON IN LOW RATE WI-FI COMMUNICATIONS

CROSS-REFERENCE TO RELATED APPLICATIONS

This application is a Continuation Application of U.S. Non-Provisional patent application Ser. No. 13/977,580 filed Jun. 28, 2013, which claims priority to U.S. Provisional Application Ser. No. 61/522,561 filed on Aug. 11, 2011 and International Application No. PCT/US2011/065572 filed on Dec. 16, 2011 the contents of which are hereby incorporated herein by reference in their entirety.

FIELD

This invention generally relates to wireless communication systems, and in particular to systems and methods for a short beacon in low rate Wi-Fi communications.

BACKGROUND

Wireless connectivity for computers is now well-established and virtually all new laptops contain a Wi-Fi capability. Of the wireless local area network (WLAN) solutions that are available, the IEEE 802.11 standards (IEEE Std. 802.11-2007, published in 2007), often termed Wi-Fi, have become the de-facto standard. With operating speeds of around 54 Mbps being commonplace, for systems using the IEEE 802.11 standards, Wi-Fi is able to compete well with wired systems, but without the need for cable connections.

Some of the established IEEE 802.11 standards may provide wireless connectivity for common devices such as laptops and smartphones; however, high bandwidth communications protocols may not be ideal for Internet connectivity with certain devices, such as small, battery-powered sensors that have limited battery capacity, require extended wireless link ranges, or that do not need to communicate at high data rates.

A beacon frame in a Wi-Fi system can serve a variety of functions, including identifying the presence of an access point, and providing information about a particular network. The IEEE 802.11ah task group was formed to provide an orthogonal frequency-division multiplexing (OFDM) system operating in the 1 GHz and lower bands. One of the goals of the IEEE 802.11ah task group is to reuse the IEEE 802.11n/ac system with new features that meet certain criteria, including long range, low data rate service (for long-range sensors, for example). Therefore, systems having bandwidths of approximately 1 to 16 MHz are being investigated for use with IEEE 802.11ah. These bandwidths may be provided by down-clocking the IEEE 802.11ac system. In such systems, it may be advantageous to structure the beacon to help meet certain criteria associated with the low data rate network.

BRIEF DESCRIPTION OF THE FIGURES

Reference will now be made to the accompanying figures and flow diagrams, which are not necessarily drawn to scale, and wherein.

DETAILED DESCRIPTION

Figure 1:
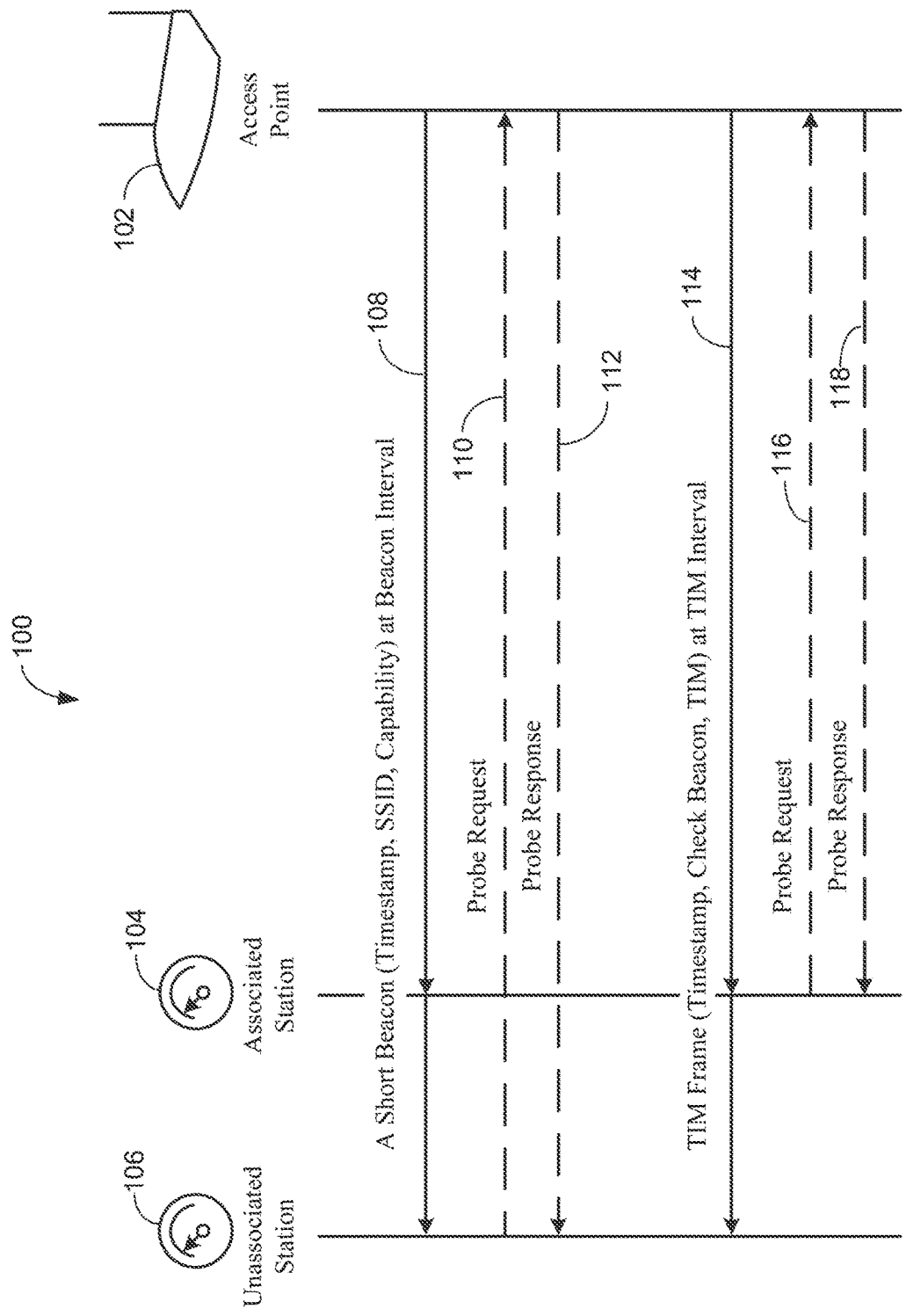
FIG. 1 is an illustrative short beacon probe timing diagram, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to, and are not intended to imply that the objects so described must be in a given sequence, either temporally, spatially, in ranking, or in any other manner.

The IEEE 802.11 standards for implementing wireless local area network computer communications include a plethora of additional standards, including new and evolving standards to address issues such as security, quality of service, new frequency bands, etc. The emerging IEEE 802.11ah specification, for example, proposes to address low rate Wi-Fi communications, which may be utilized for small, battery-powered sensors, for example. It is known that a wireless link range may be extended by reducing radio wave interaction (and resulting attenuation) with physical objects such as walls. Reducing the radio frequency (or increasing the wavelength of the radio wave) can reduce this interaction and, hence, can extend the range of wireless communication between devices. Furthermore, the IEEE 802.11ah specification proposes to address the need for conserving power or reducing power requirements in stations and wireless modems that may communicate in the Wi-Fi network.

A beacon frame is one of the management frames in IEEE 802.11 wireless local area networks (WLANs). Beacon frames are transmitted periodically according to a beacon interval to announce the presence of a WLAN network, and may be utilized for associating devices to the wireless network. The beacon frame can include information about the network including the service set identifier (SSID) which can be utilized for identifying a desired network among multiple present wireless networks. The beacon frame can also convey a timestamp. For example, after receiving the beacon frame, the associated stations may utilize the timestamp to change their local clocks to this time to facilitate synchronization. The beacon frame may also include capability information about the device or network. For example, the capability information may include polling and encryption details. The beacon can also include traffic information via a traffic indicator map (TIM).

Typical transmitted beacon frames may have an average length of 100 to 500 bytes, and may have a beacon interval of approximately 100 milliseconds and may occupy 0.5% to about 2.5% of the communication channel time (or bandwidth). However, multiple stations may be present and may have overlapping channels. In this case, beacon frame occupation times (or corresponding bandwidths) may increase linearly with the number of stations present. The longer channel occupation time not only decreases the channel efficiency, but may also have a significant impact on battery life of an ultra low power device because a station (STA) has to stay wake and wait for a longer period to transmit the frame. For example, as the wireless communication data rates are reduced, to address some of the goals of the IEEE 802.11ah specification, the typical beacon frame could consume up to 20% of the channel bandwidth.

According to an example embodiment, a short beacon frame may be utilized to improve channel efficiency for a low data rate channel. According to an example embodiment, the short beacon frame may be further utilized to enable low data rate device discovery. Small battery-powered wireless devices (e.g., sensors) may utilize example embodiments to connect via Wi-Fi, to access points with an increased range and/or conservation of the battery.

According to an example embodiment, a short beacon (with minimum or low overhead) may be utilized for advertising access points and associating stations. According to an example embodiment, after association is established, a traffic indicator map (TIM) frame may be utilized to convey additional information. According to example embodiments, the short beacon and the TIM frame may be transmitted independently at different intervals. According to example embodiments, the short beacon interval and the TIM interval may be independent, selectable, or dynamically set. In an example embodiment, the short beacon interval and/or the TIM interval may be determined dynamically based on traffic, number of clients, number of access points, etc.

Example embodiments may utilize a physical layer device (PHY) for systems and methods described herein. The PHY, for example, is a device that may include a physical coding sublayer (PCS) and a physical medium dependent (PMD) layer. According to an example embodiment, the PCS may encode and/or decode data that is transmitted and received by the PHY. Certain example embodiments of the invention may utilize the PHY for enabling wireless communication at frequencies below 1 GHz.

According to example embodiments, communication under certain IEEE standards may be performed using certain modulation coding schemes (MCS). For example, the IEEE 802.11n standard defines 77 MCS. Each MCS specifies a certain modulation (e.g., binary phase-shift keying (BPSK), quadrature phase shift keying (QPSK), quadrature amplitude modulation (QAM), etc.), coding rates (e.g., ½, ¾), guard interval (800 or 400 ns), and number of spatial streams.

In an example embodiment, the PHY may operate at bit rate corresponding to 0.813 million bits per second (Mbps), which may correspond to an 8× down-converted rate from 6.5 Mbps. (For example, 0.813=6.5 Mbps/8). According to an example embodiment, the PHY may utilize BPSK as an MCS. In an example embodiment, the resulting data rate may be approximately 0.813 Mbps. According to an example embodiment, the down-clocked rate described may correspond to ⅛ of the operation frequency described in the IEEE 802.11ac standard.

According to an example embodiment, a 2× repetition of the MCS-0 coding scheme (MCS0-R2) may be utilized. In an example embodiment, the MCS0-R2 may result in a data rate that is further decreased from 0.813 Mbps to 0.406 Mbps, but may result in an improvement in the receiver sensitivity by about 3 dB relative to the MCS-0 coding scheme. In accordance with an example embodiment, a 4× repetition of the MCS-0 coding scheme (MCS0-R4) may be utilized to decrease the data rate to 0.203 Mbps. An example embodiment of this repetition may improve receiver sensitivity by about 6 dB relative to MCS0.

FIG. 1 depicts an illustrative short beacon probe timing diagram and communication process 100 among an access point 102, one or more associated devices or stations 104, and one or more unassociated devices or stations 106, according to an example embodiment. For example, the devices 104, 106 may be stations (STA) or clients. According to an example embodiment, the access point 102 may transmit the short beacon frame 108, which may include a timestamp, an SSID, and a capability field. The SSID may be used for advertising the presence of the access point 102. The timestamp, for example, may be used for synchronization with the associated stations 104. The capability information, for example, may provide information that the stations 104, 106 can utilize for communication with the access point 102. According to an example embodiment, a short beacon may be utilized to prevent the access point 102 from transmitting a conventional beacon frame. According to an example embodiment, some of the functions of the conventional beacon may be performed with embodiments of the short beacon.

According to example embodiments, unassociated devices (or stations) 106 may send probe requests 110 to the access point 102. According to example embodiments, the access point 102 may send a probe response 112 to the unassociated station 106 in response to the probe request 110.

According to an example embodiment, after an unassociated station 106 has received the short beacon 108 and has established association with the access point 102, the access point 102 may then provide additional information via the TIM frame 114. For example, the TIM frame 114 may convey capability information changes for the associated station(s) 104. According to an example embodiment, an indication of buffered traffic for the associated station(s) 104 may also be included in the TIM frame 114.

According to example embodiments, the associated station(s) 104 may send probe requests 116 to the access point 102. According to example embodiments, the access point 102 may send a probe response 118 to the associated station(s) 104 in response to the probe request 116.

According to an example embodiment, the access point 102 may periodically transmit short beacon frames 108 at the beacon interval using a PHY configured for low data rates. According to an example embodiment, the short beacon frame 108 may be utilized by the unassociated station(s) 106 to discover the access point 102. According to an example embodiment, and as previously indicated, the short beacon frame 108 may include a timestamp, an SSID, and a capability field. In an example embodiment, the short beacon frame 108 may include an extended capability field.

According to an example embodiment, the timestamp in the short beacon frame 108 may include 8 bytes. According to other example embodiments, the timestamp may be 2 to 10 bytes. In an example embodiment, the beacon interval may include 2 bytes. In other example embodiments, the beacon interval may include 1 to 8 bytes. According to an example embodiment, the SSID may include 2 to 34 bytes. According to an example embodiment, the capability field may include 2 bytes. In another example embodiment, the capability field may include 0 to 34 bytes. In an example embodiment, an extended capability field may be provided in the beacon frame 108 and may include 2 bytes.

According to an example embodiment, the associated devices or station(s) 104 and/or the unassociated devices or station(s) 106 may be generally referred to or designated as station(s) (STA). According to an example embodiment, the STA may scan the channel in a listening mode until receiving a short beacon with a received signal strength indicator (RSSI) level exceeding a required threshold. In accordance with an example embodiment, if the SSID and the access point 102 capability fields meet the specific requirements of the STA then additional communication procedures may take place. For example, the STA may transmit a unicast probe request 110 frame to the access point 102 to get more information. In an example embodiment, the access point 102 may provide a probe response 112 in response to the probe request 110.

According to an example embodiment, a low PHY data rate access point 102 may periodically transmit TIM frames 114 at the low PHY data rate at the TIM interval. According to example embodiments, the TIM frames 114 may be broadcast according to the IEEE 802.11v standard (which was ratified as a formal amendment to the 802.11 standard on Feb. 2, 2011) for associated devices or stations 104 to get buffered data. In accordance with an example embodiment, the TIM frame 114 may include a check beacon field, a timestamp field, and a TIM element. According to an example embodiment, the check beacon field may be used by the STA to detect when new information is available. For example, when the STA receives a check beacon field that contains a value that is different from the previously received check beacon field, the STA may transmit a probe request 116 frame to the access point 102 to get more information. In an example embodiment, the access point 102 may provide a probe response 118 in response to the probe request 116.

According to an example embodiment, the beacon interval (for example, as associated with the short beacon 108) and the TIM interval (for example, as associated with the TIM frame 114) may be allowed to be different values. According to an example embodiment, the TIM interval may be set to a value larger than the beacon interval. For example, the TIM interval to beacon interval ratio may be set to approximately 10:1. According to another example embodiment, the TIM interval may be set to a much larger value than the beacon interval. For example, the TIM interval to beacon interval ratio may be set within a range from approximately 10:1 to approximately 1000:1. According to an example embodiment, the value of TIM interval may be set according to the delay tolerance of downlink traffic delivery.

Example embodiments may include a beacon frame that is shorter than the conventional beacon frame. Example embodiments may include the short beacon frame, which may be used for time sync and unassociated device discovery. Example embodiments may include a TIM frame, which may be used to indicate that there is buffered traffic for associated station(s) 104.

According to an example embodiment, the STA may transmit a probe request 110, 116 frame to get more information if received beacon information and RSSI from a short beacon 108 meet the STA's requirements. According to an example embodiment, a TIM frame 114 may be used to indicate whether there is any traffic buffered and/or if any beacon information changed for low PHY data rate device. According to an example embodiment, no conventional beacon will be transmitted. According to another example embodiment, use of the short beacon or the conventional beacon may be signaled via one or more bits in a frame associated with the medium access control (MAC) header. According to an example embodiment, an associated STA (for example, 104 of FIG. 1) may transmit a probe request 110 frame to get more information if the beacon information is changed. According to an example embodiment, an associated STA 104 may only wake up to receive the TIM frame.

Figure 2:
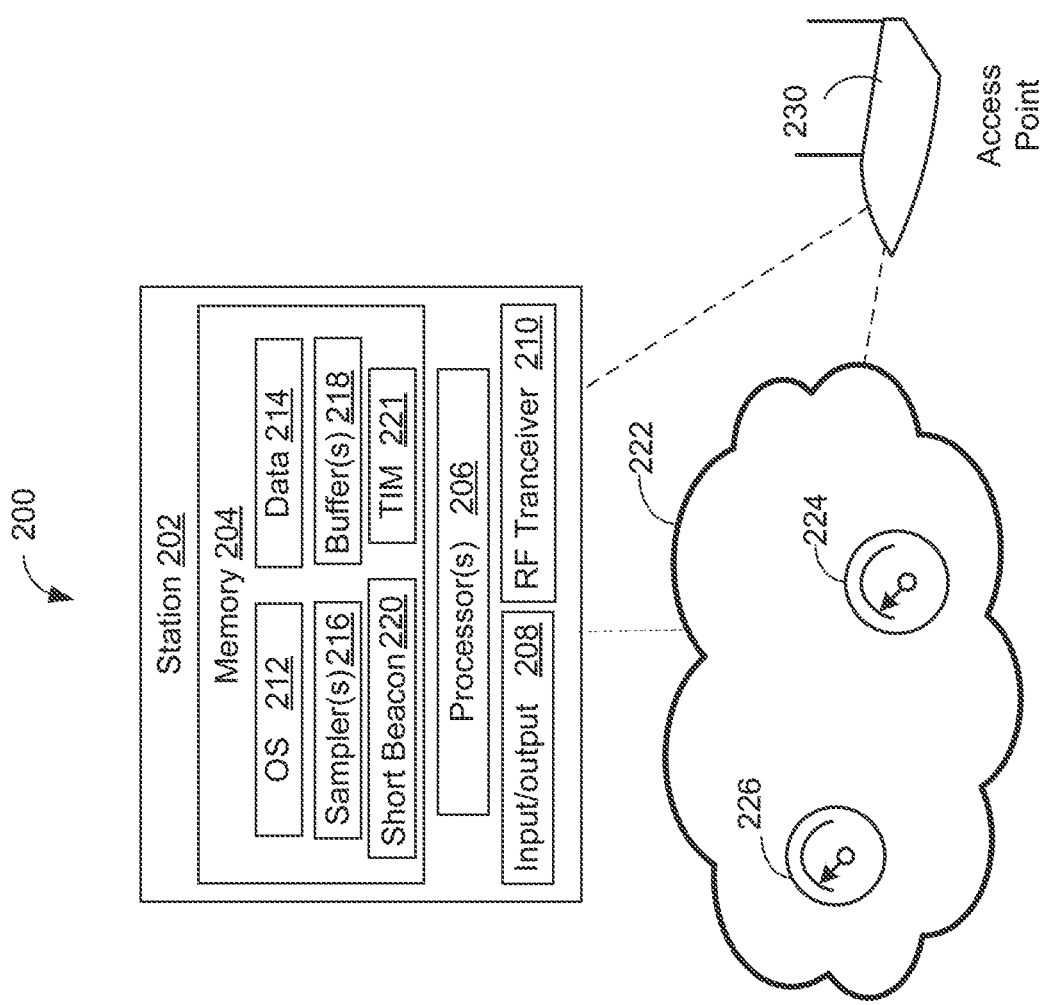
FIG. 2 is an illustrative block diagram of a low-rate communications system, according to an example embodiment of the invention.

FIG. 2 depicts a block diagram of a low rate communications system 200, according to an example embodiment of the invention. In an example embodiment, the system 200 may be utilized for a station 202 to wirelessly communicate with an access point 230, either directly, via a wireless network 222, or among other stations 224, 226 associated with the wireless network 222. According to an example embodiment, the station 202 may receive input (for example, from a sensor or information device) and may provide output information via the input/output port 208, or via a radio frequency transceiver 210. According to an example embodiment, the sensing or information device could include a computer, a laptop, a switch, a detector, a myriad of sensor types, etc. According to an example embodiment, the radio frequency transceiver 210 may connect to one or more internal antennas. According to an example embodiment, the radio frequency transceiver 210 may connect to one or more external antennas, which according to example embodiments, may or may not be considered an integral component of the station 202.

According to example embodiments, the station 202 may perform the basic functions associated with communicating information from the sensing or information device to the access point 230 or other stations 224, 226 in the wireless network 222. According to an example embodiment, the station 202 may include a memory 204, one or more processor(s) 206, an input/output port 208, and a radio frequency transceiver 210. According to an example embodiment, the memory 204 may include an operating system 212 or microprocessor-readable instructions. In an example embodiment, the memory 204 may include and handle data 214. According to an example embodiment, the memory may include buffers 218. According to certain example embodiments, at least a portion of the memory 204 may be utilized in conjunction with a sampler 216. In an example embodiment, the sampler 216 may be implemented in hardware, and may be considered to be handled by processor(s) 206. In an example embodiment, the memory 204 may include a section dedicated to generating the short beacon 220. In an example embodiment, the short beacon 220 may be generated or handled by the processor(s) 206.

Figure 3:
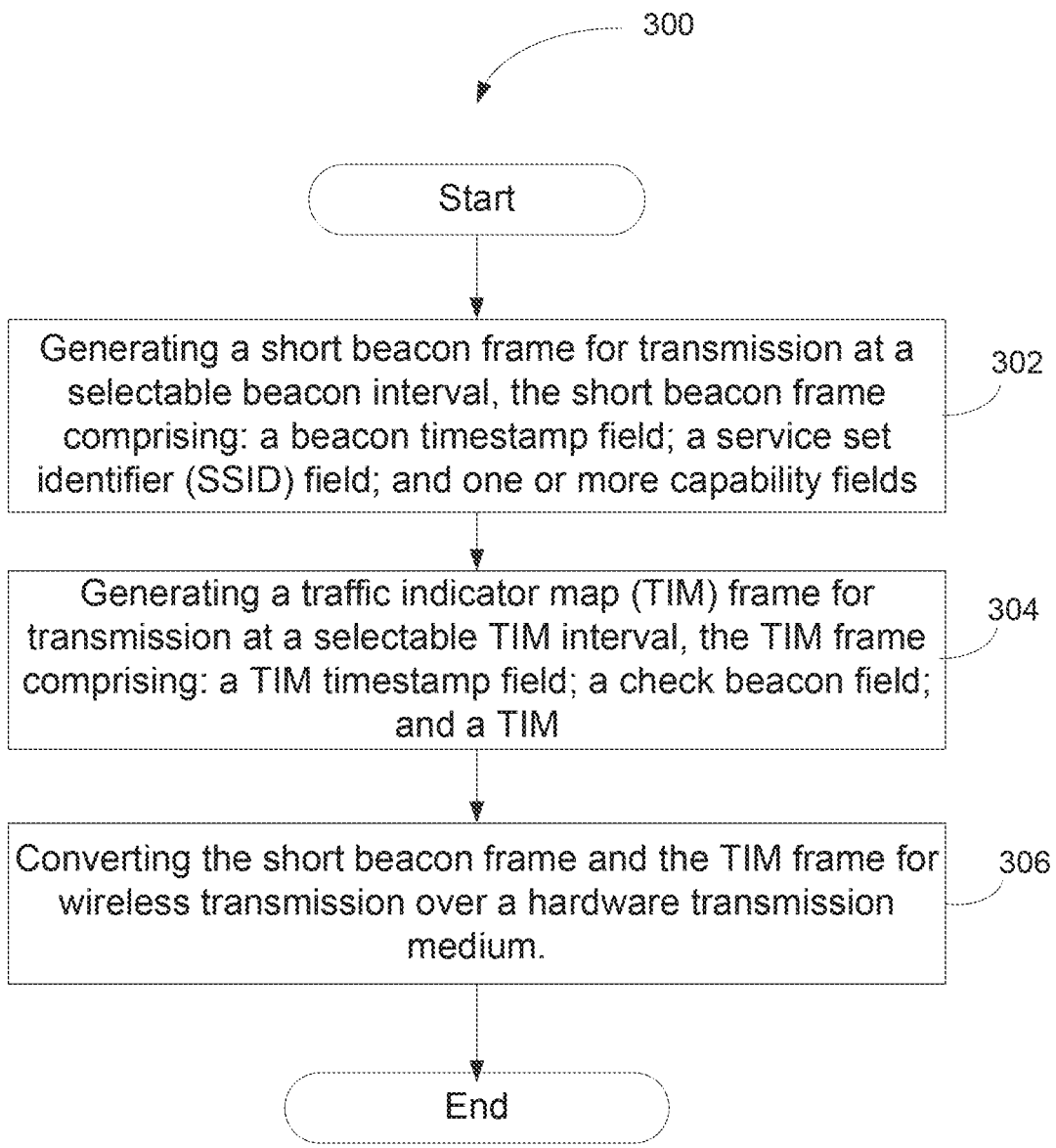
FIG. 3 is a flow diagram of an example method for generating a short beacon, according to an example embodiment of the invention.

An example method 300 for generating a short beacon will now be described with reference to the flow diagram of FIG. 3. The method 300 starts in block 302, and according to an example embodiment of the invention includes generating a short beacon frame for transmission at a selectable beacon interval, the short beacon frame comprising: a beacon timestamp field; a service set identifier (SSID) field; and one or more capability fields. In block 304, the method 300 includes generating a traffic indicator map (TIM) frame for transmission at a selectable TIM interval, the TIM frame comprising: a TIM timestamp field; a check beacon field; and a TIM. In block 306, the method 300 includes converting the short beacon frame and the TIM frame for wireless transmission over a hardware transmission medium. The method 300 ends after block 306.

Any one or more of the embodiments described herein may be used alone, or in combination with any of the other embodiments set forth.

According to an example embodiment, a ratio of the TIM interval to the beacon interval is set within a range from approximately 10:1 to approximately 1000:1. According to an example embodiment, the TIM interval is set according to a delay tolerance of downlink traffic delivery. According to an example embodiment, converting the short beacon frame and the TIM frame includes signaling a short beacon mode by setting one or more MAC header frames. According to an example embodiment, generating the short beacon frame includes generating an 8 byte beacon timestamp field, a 2 byte beacon interval, a 2 to 34 byte SSID field, and a 2 byte capability field. According to an example embodiment, generating the short beacon frame may include generating a 2 byte extended capability field. According to an example embodiment, generating the TIM frame comprises generating an 8 byte TIM timestamp field, a 2 byte TIM interval, and a 2 to 34 byte TIM. According to an example embodiment, the short beacon frame and the TIM frame may be transmitted by the transmission medium.

Example embodiments may include a system that includes at least one access point device. The at least one access point or station may include at least one memory for storing data and computer-executable instructions; and one or more processors configured to access the at least one memory and further configured to execute computer-executable instructions for generating a short beacon frame. According to an example embodiment, the access point may generate the short beacon for transmission at a selectable beacon interval. According to an example embodiment, the short beacon frame can include: a beacon timestamp field; a service set identifier (SSID) field; and one or more capability fields. According to an example embodiment, the one or more processors may be further configured for generating a traffic indicator map (TIM) frame for transmission at a selectable TIM interval. According to an example embodiment, the TIM frame may include a TIM timestamp field; a check beacon field; and a TIM.

According to an example embodiment, the one or more processors may be further configured for converting the short beacon frame and the TIM frame for wireless transmission by the at least one access point device. According to an example embodiment, the TIM interval to the beacon interval is set within a range from approximately 10:1 to approximately 1000:1. According to an example embodiment, the TIM interval is set according to a delay tolerance of downlink traffic delivery. According to an example embodiment, converting the short beacon frame and the TIM frame comprises signaling a short beacon mode by setting one or more MAC header frames. According to an example embodiment, generating the short beacon frame includes generating an 8 byte beacon timestamp field, a 2 byte beacon interval, a 2 to 34 byte SSID field, and a 2 byte capability field. According to an example embodiment, generating the short beacon frame includes generating a 2 byte extended capability field. According to an example embodiment, generating the TIM frame includes generating an 8 byte TIM timestamp field, a 2 byte TIM interval, and a 2 to 34 byte TIM. According to an example embodiment, the short beacon frame and the TIM frame are transmitted by the at least one access point device.

Example embodiments may include a system that may include at least one station. The at least one station may include at least one memory for storing data and computer-executable instructions; one or more processors configured to access the at least one memory and further configured to execute computer-executable instructions for: receiving a short beacon frame at a selectable beacon interval from an access point device. According to an example embodiment, the short beacon frame may include: a beacon timestamp field; a service set identifier (SSID) field; and one or more capability fields. According to an example embodiment, the at least one station may be configured for receiving a traffic indicator map (TIM) frame for reception at a selectable TIM interval. According to an example embodiment, the TIM frame may include a TIM timestamp field; a check beacon field; and a TIM.

According to an example embodiment, the one or more processors are further configured for processing the received short beacon frame and the received TIM frame. According to an example embodiment, a ratio of the TIM interval to the beacon interval is within a range from approximately 10:1 to approximately 1000:1. According to an example embodiment, the TIM interval corresponds to a delay tolerance of traffic delivery. According to an example embodiment, receiving the short beacon frame and the TIM frame includes receiving one or more MAC header frames. According to an example embodiment, receiving the short beacon frame includes receiving an 8 byte beacon timestamp field, a 2 byte beacon interval, a 2 to 34 byte SSID field, and a 2 byte capability field. According to an example embodiment, receiving the short beacon frame comprises receiving a 2 byte extended capability field. According to an example embodiment, receiving the TIM frame includes receiving an 8 byte TIM timestamp field, a 2 byte TIM interval, and a 2 to 34 byte TIM.

Example embodiments include a computer program product. The computer program product may include a computer-usable medium having a computer-readable program code embodied therein. The computer readable program code may be adapted to be executed to implement a method for generating a short beacon. The method may further include generating a short beacon frame for transmission at a selectable beacon interval. The short beacon frame can include a beacon timestamp field; a service set identifier (SSID) field; and one or more capability fields. The method can include generating a traffic indicator map (TIM) frame for transmission at a selectable TIM interval. The TIM frame can include a TIM timestamp field; a check beacon field; and a TIM. The method can include converting the short beacon frame and the TIM frame for wireless transmission over a hardware transmission medium.

According to an example embodiment, a ratio of the TIM interval to the beacon interval is set within a range from approximately 10:1 to approximately 1000:1. According to an example embodiment, the TIM interval is set according to a delay tolerance of downlink traffic delivery. According to an example embodiment, converting the short beacon frame and the TIM frame comprises signaling a short beacon mode by setting one or more MAC header frames. According to an example embodiment, generating the short beacon frame comprises generating an 8 byte beacon timestamp field, a 2 byte beacon interval, a 2 to 34 byte SSID field, and a 2 byte capability field. According to an example embodiment, generating the TIM frame includes generating an 8 byte TIM timestamp field, a 2 byte TIM interval, and a 2 to 34 byte TIM.

According to example embodiments, certain technical effects can be provided, such as creating certain systems and methods that enable small battery-powered wireless devices (e.g., sensors) to utilize Wi-Fi for connecting to the Internet with very low power consumption. Example embodiments of the invention can provide the further technical effects of improving channel efficiency and battery life of sensor devices.

Example embodiments of the invention may include any number of hardware and/or software applications that are executed to facilitate any of the operations. In example embodiments, one or more input/output interfaces may facilitate communication between the access points, Wi-Fi terminals, stations, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the access points, Wi-Fi terminals, stations, and one or more input/output devices. The one or more input/output interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network, any wired network, any wireless network, etc., for communication with external devices and/or systems.

As desired, embodiments of the invention may include communication between components with more or less of the components illustrated in FIG. 1 or FIG. 2.

Certain embodiments of the invention are described above with reference to block and flow diagrams of systems and methods and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques described above may be embodied in a computer-readable medium for configuring a computing system to execute the method. The computer-readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-topoint telecommunication equipment, carrier wave transmission media, and the Internet, just to name a few. Other new and various types of computer-readable media may be used to store and/or transmit the software modules discussed herein. Computing systems may be found in many forms including, but not limited to, mainframes, minicomputers, servers, workstations, personal computers, notepads, personal digital assistants, various wireless devices, networks, cloud computing, and embedded systems, just to name a few. A typical computing system includes at least one processing unit, an associated memory and a number of input/output (I/O) devices. A computing system processes information according to a program and produces resultant output information via input/output devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The claimed invention is:

1. A computer-readable non-transitory storage medium that contains instructions, which when executed by one or more processors result in performing operations comprising:
    generating a beacon frame for a sub one gigahertz (GHz) transmission at a short beacon interval, the beacon frame comprising:
        a timestamp field, for synchronization of a clock in a device receiving the beacon frame;
        a service set identifier (SSID) field; and
        one or more capability fields;
    generating a traffic indicator map (TIM) element for transmission at a TIM interval, the TIM element comprising a TIM;
    transmitting the beacon frame over a wireless communication medium;
    receiving a probe request from an unassociated device after the beacon frame is transmitted;
    transmitting the TIM element over the wireless communications medium, wherein the TIM interval is set to a value larger than the short beacon interval, wherein a ratio of the TIM interval to the short beacon interval is greater than or equal to 10:1; and
    causing to send a probe response to the unassociated device after the transmitting of the beacon frame, and before the transmitting of the TIM element.

2. The medium of claim 1, wherein a ratio of the TIM interval to the short beacon interval is within a range from 10:1 to 255:1.

3. A method of communicating wirelessly, comprising:
    generating a beacon frame for a sub one gigahertz (GHz) transmission at a short beacon interval, the beacon frame comprising:
        a timestamp field, for synchronization of a clock in a device receiving the beacon frame;
        a service set identifier (SSID) field; and
        one or more capability fields;
    generating a traffic indicator map (TIM) element for transmission at a TIM interval, the TIM element comprising a TIM;
    transmitting the beacon frame over a wireless communication medium;
    receiving a probe request from an unassociated device after the beacon frame is transmitted;
    transmitting the TIM element over the wireless communications medium, wherein the TIM interval is set to a value larger than the short beacon interval, wherein a ratio of the TIM interval to the short beacon interval is greater than or equal to 10:1; and
    causing to send a probe response to the unassociated device after the transmitting of the beacon frame, and before the transmitting of the TIM element.

4. The method of claim 3, wherein a ratio of the TIM interval to the short beacon interval is within a range from 10:1 to 255:1.

5. A wireless communications device, comprising:
    one or more memory that stores computer-executable instructions; and
    one or more processors configured to access the one or more memory, wherein the one or more processors are configured to execute the computer-executable instructions to:
        generate a beacon frame for a sub one gigahertz (GHz) transmission at a selectable beacon interval, the beacon frame comprising:
            a timestamp field, for synchronization of a clock in a device receiving the beacon frame;
            a service set identifier (SSID) field; and
            one or more capability fields;
        generate a traffic indicator map (TIM) element for transmission at a TIM interval, the TIM element comprising a TIM;
        transmit the beacon frame over a wireless communication medium;
        receive a probe request from an unassociated device after the beacon frame is transmitted;
        transmitting the TIM element over the wireless communications medium, wherein the TIM interval is set to a value larger than the short beacon interval, wherein a ratio of the TIM interval to the short beacon interval is greater than or equal to 10:1; and
        transmit a probe response to the unassociated device after the transmitting of the beacon frame, and before the transmitting of the TIM element.

6. The wireless communications device of claim 5, wherein a ratio of the TIM interval to the short beacon interval is within a range from 10:1 to 255:1.

7. The wireless communications device of claim 5, further comprising:
    a transceiver; and
    an antenna.

8. A wireless communications device comprising a processor and a memory, wherein the device is configured to:
    generate a traffic indicator map (TIM) frame, the TIM frame comprising a Check Beacon field, a TIM timestamp field, and a TIM, wherein the TIM timestamp field is for synchronization of a clock in a device receiving a short beacon frame using a sub one gigahertz (GHz) transmission;
    transmitting the beacon frame;
    receive a probe request from an unassociated device after transmitting the beacon frame;

transmit the TIM frame over a wireless communication medium based on a TIM interval, wherein the TIM interval is set to a value larger than a short beacon interval, wherein a ratio of the TIM interval to the short beacon interval is greater than or equal to 10:1; and transmit a probe response to the unassociated device after the beacon frame is transmitted, and before the transmitting of the TIM frame.

9. The wireless communications device of claim 8, wherein a ratio of the TIM interval to the short beacon interval is within a range from 10:1 to 255:1.

10. A method of wireless communication, comprising:

generating a traffic indicator map (TIM) frame, the TIM frame comprising a Check Beacon field, a TIM timestamp field, and a TIM, wherein the TIM timestamp field is for synchronization of a clock in a device receiving a short beacon frame received on a sub one gigahertz (GHz) transmission;

transmitting the beacon frame;

receiving a probe request from an unassociated device after transmitting the beacon frame;

transmitting the TIM frame over a wireless communication medium based on a TIM interval, wherein the TIM interval is set to a value larger than a short beacon interval, wherein a ratio of the TIM interval to the short beacon interval is greater than or equal to 10:1; and causing to send a probe response to the unassociated device after the beacon frame is transmitted, and before the transmitting of the TIM frame.

11. The method of claim 10, wherein a ratio of the TIM interval to the short beacon interval is within a range from 10:1 to 255:1.

12. A computer-readable non-transitory storage medium that contains instructions, which when executed by one or more processors result in performing operations comprising:

generating a traffic indicator map (TIM) frame, the TIM frame comprising a Check Beacon field, a TIM timestamp field, and a TIM, wherein the TIM timestamp field is for synchronization of a clock in a device receiving a short beacon frame received on a sub one gigahertz (GHz) transmission;

transmitting the beacon frame;

receiving a probe request from an unassociated device after receiving the beacon frame;

transmitting the TIM frame over a wireless communication medium based on a TIM interval, wherein the TIM interval is set to a value larger than a short beacon interval, wherein a ratio of the TIM interval to the short beacon interval is greater than or equal to 10:1; and causing to send a probe response to the unassociated device after the beacon frame is transmitted, and before the transmitting of the TIM frame.

13. The computer-readable non-transitory storage medium of claim 12, wherein a ratio of the TIM interval to the short beacon interval is within a range from 10:1 to 255:1.

* * * * *